Feb. 16, 1965 L. F. STRINGER ETAL 3,170,101
SAMPLED DATA SYSTEM FOR AUTOMATIC GAUGE CONTROL
Filed Feb. 10, 1961 2 Sheets-Sheet 1

INVENTORS
Loren F. Stringer and
John W. Wallace
BY
ATTORNEY

United States Patent Office 3,170,101
Patented Feb. 16, 1965

3,170,101
SAMPLED DATA SYSTEM FOR AUTOMATIC
GAUGE CONTROL
Loren F. Stringer, Clarence, and John W. Wallace,
Orchard Park, N.Y., assignors to Westinghouse Electric
Corporation, East Pittsburgh, Pa., a corporation of
Pennsylvania
Filed Feb. 10, 1961, Ser. No. 88,525
6 Claims. (Cl. 318—28)

In general this invention relates to automatic gauge control systems and more particularly to those automatic gauge control systems which use variable voltage screwdown motors.

This invention relates to a system for controlling the thickness of a sheet through the use of mill screwdown controls. A sampling, or ON-OFF, type controller for the screwdown function provides the automatic gauge control. The screwdown control hereinafter described will automatically adjust roll opening as required to maintain desired gauge. The system can supplement a tension control system to keep gauge deviations within the range which can be corrected by the tension control system. A tension control system which may be utilized in conjunction with this system is shown in U.S. patent application, Serial No. 30,937, "Workpiece Thickness Control Apparatus," filed May 23, 1960, by John W. Wallace and Paul E. Jacobs and now U.S. Patent 3,089,365. The automatic gauge control system will not limit manual adjustment of the mill controls but may reverse such an adjustment if it interferes with holding a proper gauge when returned to automatic control.

It is a general object of this invention to provide a simpler and better performing automatic screwdown control for rolling mills.

Another object is to provide a better automatic gauge control system in which an improved ON-OFF type controller is utilized for providing the screwdown function.

Another object is to provide an improved automatic gauge control system of the ON-OFF type in which the maximum error that can be handled in one cycle is not limited by response time.

Another object is to provide a better automatic gauge control for screwdown operation in which the maximum error of the system depends only on the range available on the sensing devices when used to obtain a given minimum accuracy.

Another object is to provide an improved automatic screwdown control system for rolling mill operation of the ON-OFF type in which the correction cycle is kept to an absolute minimum by measuring the transport time delay immediately upon stopping of the screws.

Another object of this invention is to provide an improved automatic gauge control system of the ON-OFF type which will not wear out the screwdown rolls or motors, by providing an adjustable inert zone that will allow the minimum sensitivity of the automatic gauge control to be set at any desired value.

Another object of this invention is to provide an improved automatic gauge control system which utilizes only static components.

Still further objects and the entire scope of applicability of the present invention will become apparent from the detailed description given hereinafter; it should be understood, however, that the detailed description while indicating preferred embodiments of the invention is given by way of illustration only since various changes and modifications within the spirit and scope of the invention will become apparent to those skilled in the art from the detailed description.

The apparatus of this invention will become more readily apparent by reference to the attached drawings, in which.

Figure 1:
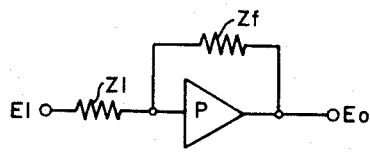
FIGURE 1 is a diagrammatic showing of a well known operational amplifier used in the present invention.

FIGURE 1 shows a well known operational amplifier used in the present invention. The term operational amplifier is generally applied to a high gain D.C. amplifier used to perform mathematical operations including calculus by means of passive inputs and feedback networks. The following is a brief review of operational amplifier usage. In FIGURE 1, the input E1 is fed through an impedance Z1. This input voltage E1 is fed to a high negative gain D.C. amplifier P which has a feedback impedance Zf and the output of the amplifier P is Eo. In a recent publication "Electronic Analog Computers" by A. Korn and T. M. Korn, 1952, McGraw Hill Book Co., at page 148 it was shown that if the gain of the amplifier P is very large (1) $$\frac{Eo}{E1} = -\frac{Zf}{Z1}$$

The ratio $Eo/E1$ is dependent only on the passive impedance $Zf$ and $Z1$.

Figure 2:
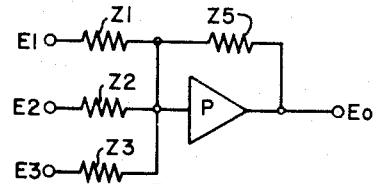
FIG. 2 is a diagrammatic showing of a well known summing or summer amplifier used in the present invention.

FIGURE 2 shows a summing amplifier and it can be shown from the above publication that if the gain of amplifier P is very large (2) $$Eo = -E1\left(\frac{Zf}{Z1}\right) - E2\left(\frac{Zf}{Z2}\right) - E3\left(\frac{Zf}{Z3}\right)$$

Using standard analog computer techniques, many operations can be accurately performed with an operational amplifier. For example, in FIGURE 1 if $Zf$ represents a capacitor C and Z1 represents a resistor $R_1$ (3) $$\frac{Eo}{E1} = \frac{-1}{RC_p}$$

and the operational amplifier P becomes an integrator with a gain of $1/RC$.

Similarly if $Zf$ is replaced by a resistor $Rf$ and Z1 is replaced by a resistor R1 the operational amplifier provides an accurate gain (4) $$\frac{Eo}{E1} = -\frac{Rf}{R1}$$

Many other operations are possible including differentiation time delay and function generation using operational amplifiers.

The foregoing relationships are obtained by making the gain of the amplifier P very high. This requirement is met by using a high gain D.C. amplifier.

A NOR element has a plurality of inputs and is operative such that the provision of any input prevents an output signal. Only when there are no inputs to a NOR element will there be an output signal. The NOR elements used in this invention are standard and well known devices in the art and are of the type shown in the following two articles. One article is by William D. Rowe and entitled "The Transistor NOR Circuit" 1957 in the IRE Wescon Convention Record, Part IV, pages 231 through 245, and the other article by R. A. Mathias, and entitled "Static Switching Devices" is in Control Engineering Magazine, May 1957, pages 82–84.

Figure 3:
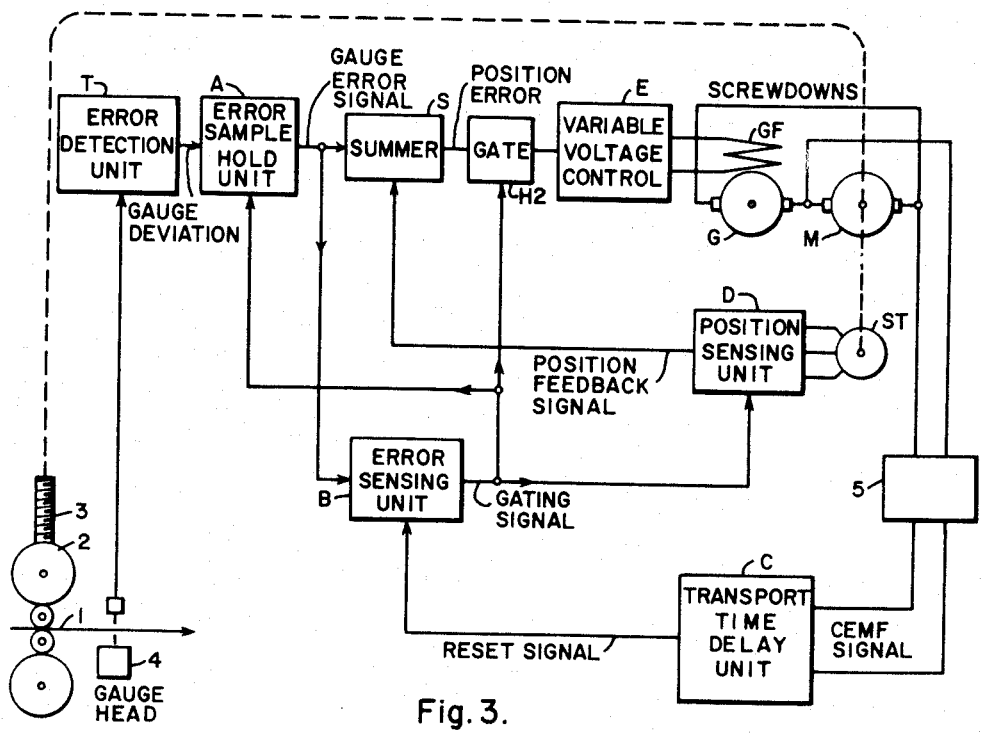
FIG. 3 is a diagrammatic showing of the control system of the present invention.

FIG. 3 is a diagrammatic showing of the present basic system for automatic gauge control utilizing a variable voltage screwdown. Sheet material 1 such as steel is driven through mill rolls 2, which control the thickness of the sheet material 1. Vertical relative movement of the mill rolls 2 is accomplished by means of screws 3 which act to vary the thickness of the sheet material 1. At a distance from the rolls 2, is a thickness gauge 4 which measures the thickness of the sheet material 1. The thickness gauge 4 delivers a signal to an error detection device T which compares the actual thickness of the sheet with a reference signal proportional to the desired thickness of the sheet. The difference between the measured thickness and the reference thickness is transmitted as a signal to an error sample hold unit A. This error signal is also fed to an error sensing unit B. The purpose of the error sensing unit B is to determine when the error signal is greater than a given error signal. When the error signal is greater than the given error signal a gating signal is transmitted by the error sensing unit B. This gating signal is applied to each of a position sensing unit D, the error sample hold unit A, and a gate H2.

The screw 3 is moved by a variable voltage drive comprising motor M, generator G, and its associated field winding GF. A variable voltage controller E supplies the generator field GF. If gate H2 is closed, signals are fed from a summer amplifier S to the variable voltage controller E. Movement of the screw-down rolls 2 is sensed by a synchro-transmitter ST which sends a signal to a position sensing unit D. The output of this position sensing unit feeds the summer amplifier S. This latter output is a feedback signal proportional to a change in the position of the screwdown rolls from the position last measured by the synchro-transmitter ST.

At the beginning of any cycle of operation, the gating signal from the error sensing unit B is operative to (1) allow error signals to pass through the error sample hold unit A, (2) open gate H2 to prevent signals from the summer amplifier S being applied to the variable voltage controller E, and (3) condition position sensing unit D so that it sets a new reference for the position feedback signal. When an error signal greater than the given minimum error signal is applied to the error sensing unit B, a gating signal is transmitted which; (1) uncouples the output of the error detection device T from the error sample hold unit A and at the same time holds the last measured error at the output of the error sample hold unit A; (2) it closes gate H2 so as to allow the output of the summer amplifier S to be applied to the variable voltage controller E and (3) it causes position sensing unit D to transmit a position feedback signal proportional to the change in the position of the screwdown rolls 2 from the position it occupied before the gate signal was applied. This position signal is applied as a feedback to the summer S in opposition to the output of the error sample hold unit A.

The operation of the system shown in FIG. 3 is as follows:

Thickness signals are sensed by the gauge 4 and compared with a reference signal at error detection device T which feeds the resulting error signal to the error sample hold unit A. This signal is fed to the summer amplifier S and the error sensing unit B. The output of the summer amplifier S is fed to the open gate H2 and cannot be utilized by the variable voltage controller E. Therefore, the variable voltage drive is at rest and the position of the screwdown rolls is held constant. If the error signal is greater than a diven error signal, the error sensing unit B produces an output gating signal which is applied to the error sample hold unit A. When this occurs, the error sample hold circuit uncouples the error detection device T from the error sample hold unit A, holds the last measured error signal, and applies it continuously to the summer amplifier S. The gating signal also closes the gate H2 so that the output of the summer amplifier S is applied to the variable voltage controller E. This produces a movement of the screwdown rolls 2. The gating signal simultaneously causes the position sensing unit D to hold as its reference the position of the screwdown rolls before the application of the gating signal and applies a signal proportional to any changes in the position of the screwdown rolls as a feedback signal to the summer amplifier S. When the output of the summer amplifier S reaches zero, at a time when the feedback signal equals the error signal, the motor M will stop and the screwdown rolls 2 will also have reached the end of their movement. A counter EMF sensing device 5 senses the stopping of the motor M and applies a signal to the transport time delay unit C. The transport time delay unit C applies a reset signal during or after a time delay equal to the time necessary for strip material 1 at the screwdown rolls 2 to reach the gauge head 4. This reset signal is applied to the error sensing unit B to reset the output gating signal so that gate H2 will again be open, the error sample hold unit A will again receive error signals from the error detection device T and position sensing unit D will be provided with a new reference corresponding to the new position of the screwdown rolls 2.

Figure 4:
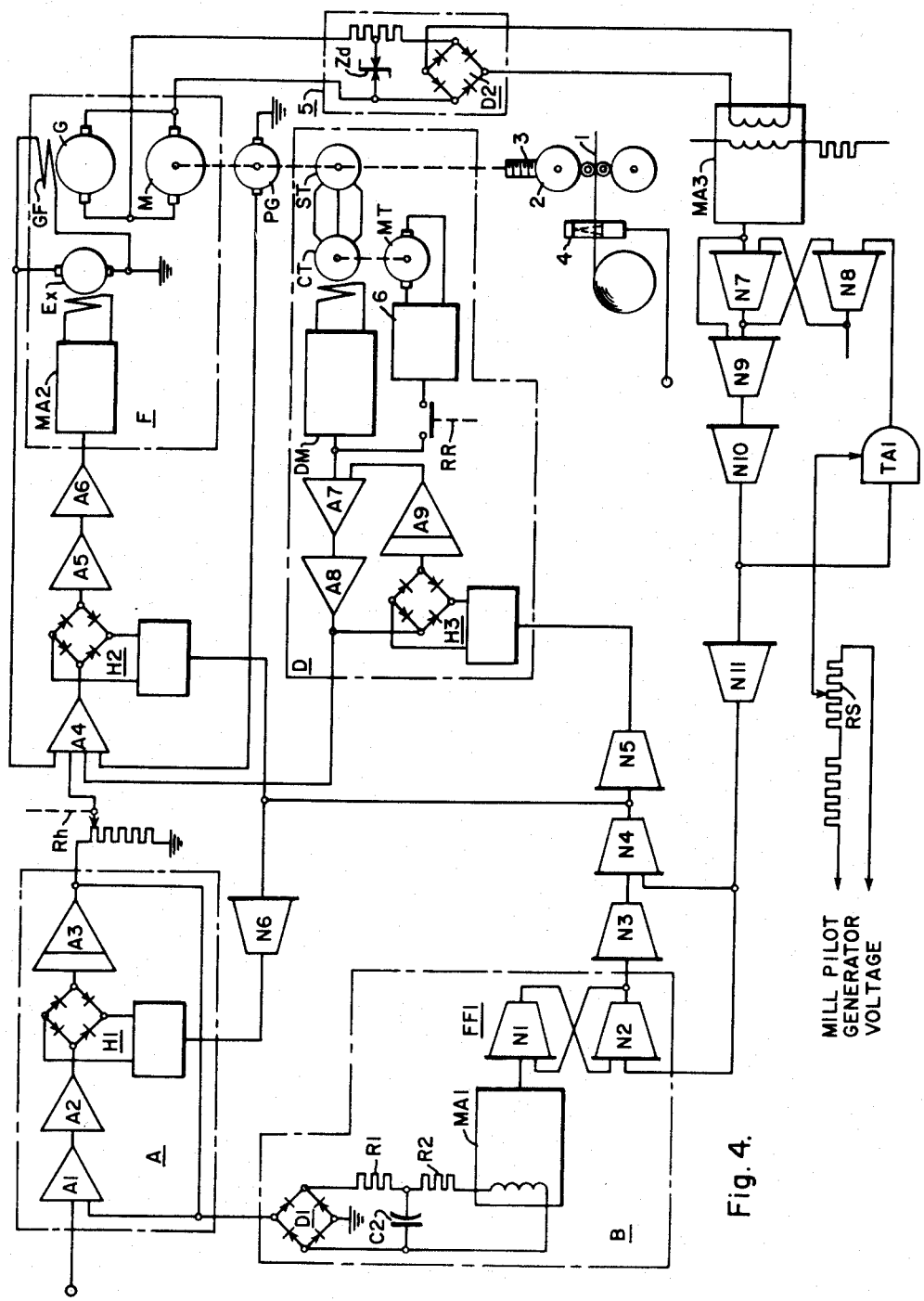
FIG. 4 is one schematic showing of the type of control system shown in FIG. 3.

Referring to FIG. 4 the system therein shown discloses a detailed embodiment of the system previously described with reference to FIG. 3. A signal input representing the magnitude of the thickness error is fed into the sample hold circuit A. Sample hold circuit A consists of operational amplifiers A1, and A2, biased diode gate H1, and integrating operational amplifier A3. With gate H1 conductive, this circuit amplifies the error signal and presents it to the error magnitude sensing circuit B and the summing amplifier A4 of the position regulator through a hardness rheostat R$h$. The error magnitude sensing circuit B consists of a full wave rectifier D1 whose output feeds an RC circuit consisting of resistances R1, and R2 and capacitor C2. The voltage produced across the capacitor C2 is fed into a bistable magnetic amplifier MA1. The output of the summing amplifier A4 is stopped from affecting the position regulator unless gate H2 is conductive. Gate H2 will be made conductive by the error sensing circuit B, if the error is above a minimum magnitude.

The output of the bistable magnetic amplifier MA1 will be a "zero" until the magnitude of the error signal exceeds a given minimum value. At that point the output of the magnetic amplifier MA1 will change from a "zero" to a "one." The output of the magnetic amplifier MA1 feeds a NOR flip-flop FF1 consisting of NOR elements N1 and N2. When the output of the magnetic amplifier MA1 is "zero" the output of the NOR element N2 will be a "zero." When the magnetic amplifier MA1 changes state so that its output is a "one," the output of the flip-flop FF1 will also change from a "zero" to a "one." The output of the NOR N2 is fed through two series NOR circuits N3 and N4. The output of NOR N4 controls three gates H1, H2 and H3. The output of NOR N4 is fed directly to gate H2 and through an inverting NOR element N6 to the gate H1 and through an inverting NOR element N5 to the gate H3. A "one" signal applied to a gate makes it conductive. When the output of the bistable magnetic amplifier MA1 is "zero" the output of NOR element N2 will be "zero" and the output of NOR element N4 will be "zero." When the output of NOR element N4 is "zero" gate H1 will be conductive, gate H2 will be non-conductive and gate H3 will be conductive. If the input error signal is above a minimum magnitude, the output of the bistable magnetic amplifier MA1 will be "one" and following the operation described above, gate H2 will be made conductive and gates H1, and H3 will be non-conducting.

If gate H1 is non-conducting, the error signal input will be held on the output by the integrating operational amplifier A3, and the output of the error sample hold circuit will not follow the input until the gate H1 is again made conductive. When gate H3 is non-conductive, it will cause the position sensing unit D to be operative.

The position regulation system consists of the summing amplifier A4, the gate H2, amplifiers A5 and A6, screwdown controller F and position sensing unit D. The screwdown controller F consists of a power magnetic amplifier MA2, an exciter EX, the generator G and the motor M. A synchro-transmitter ST is coupled to the screwdown motor M and provides an electrical signal determined by its position of rotation. This electrical signal is supplied to a synchro-control transformer CT which transfers the signal to a demodulator DM or phase sensitive rectifier. The demodulator DM determines in which direction the position of the screws 3 has changed by the phasing, and the magnitude of the change by the magnitude of the signal. This is a standard method of determining the direction and magnitude of a change in rotation and any other method known in the art may be substituted without adding or subtracting from the invention. A D.C. signal is thus obtained from the demodulator that is proportional to the screw position change from a given reference and is positive if the screws move up and negative if they move down. If gate H3 is not conductive this signal from the demodulator DM is fed through the summing amplifier A7 and amplifier A8 to the summing amplifier A4. The reference for the position feedback loop is obtained from the integrating amplifier A9. The output of the integrating amplifier A9 is fed to the summing amplifier A7 as a feedback signal in opposition to the output of the demodulator DM.

Since the gauge 4 is some distance from the rolls 2, it is necessary to allow for this delay in the measurement in order to prevent instability and over-correction. This is accomplished through the use of a transport time delay circuit. When the sum of the inputs to the summing amplifier A4 is "zero," the motor M stops. The screwdown motor voltage or counter electromotive force is applied to a voltage detection device such as a bistable magnetic amplifier MA3 through a double ended Zener diode Zd and its associated full wave rectifier D2. The output of the voltage detector magnetic amplifier MA3 operates a memory flip-flop FF2 consisting of NOR elements N7 and N8 which memory feeds a timer TA1 through a pair of NORs N9 and N10.

Initial conditions are as follows: The output of the voltage detector MA3 is "zero," the output of NOR N7 is "one," NOR 9 is "zero," NOR 10 "one," and the output of the timer TA1 is "zero." The output of NOR 10 feeds a NOR element N11 used to transmit a reset signal to the system.

When the screwdown motor M is first energized the counter EMF detector 5 transmits a signal to the bistable magnetic amplifier MA3 switching it from "zero" to "one." This acts to flip the flip-flop FF2 so that the output of NOR element N7 will be "zero," and does not affect the rest of the system as the output of magnetic amplifier MA3 holds NOR element N9 with a "zero" output. When the motor M completes its position movement the motor counter EMF reduces enough to switch the magnetic amplifier MA3 from a "one" to a "zero." Since the both inputs to the NOR element NR are now "zero," the output of the NOR element N9 will switch to a "one" and NOR element N10 will have a "zero" output. This acts to immediately send a reset signal from the output of NOR element N11 and at the same time starts the timer TA1. Thus, when the bistable magnetic amplifier MA3 drops out, a "zero" appears on the timer TA1 input. The timer TA1 has previously been held ready to time out by the "one" input. When the "one" is removed from the timer input, it times out, and a "one" appears on its output after a set time delay. This output resets the input memory flip-flop FF2 and completes the cycle. A reset signal has thus been applied to the control for the full transport time. The transport time is varied by the mill speed signal voltage which is applied to another input on the timer TA1. This voltage in effect pre-charges a timing capacitor, or any other available means of affecting a variable time delay, and varies the time delay inversely proportional to the voltage. The mill speed signal voltage is obtained from the mill pilot generator PG and applied to a variable resistor Rs.

The operation of the system of FIG. 4 is as follows: A signal input representing the magnitude of the thickness error is fed into sample hold circuit A. Before the application of this signal, the gate H1 is conducting, the gate H2 is not conducting, and the gate H3 is conducting. The sample hold circuit is actually an analog memory device. The input signal is applied to an integrating amplifier A3 whose output is fed back to be compared to the input signal in summing amplifier A1 forming a closed feedback loop. Thus the output of the integrator follows the error signal input except for a small time lag introduced by the integrating time constant. On the input to the integrator is a gating circuit H1 which can turn on or off the input to the integrator depending on whether a gating signal is present or absent. If the gate H2 is made conductive, the output of the integrator follows the error input. If the gate H1 is made non-conductive, the integrator A3 no longer receives an input so it just holds the output that was present when the gate was conducting. Thus it remembers the error that existed, and holds this value as long as needed to move the screws to correct for the value of the error. The output of the integrating amplifier A3 is fed to the error magnitude sensing circuit B. This circuit is used to keep the screwdown activity to a reasonable amount by blocking the error signal from being applied to the screwdown controller unless this error is of sufficient magnitude to warrant correction. The strip and thickness gauges contain minor variations and noise signals that would otherwise cause the screws to continually be energized in an erratic manner and there would be needless wear and the possibility of overheating. Therefore, the inert zone is set to operate the gates when the error exceeds a minimum set value. When the gates operate, the full error is applied because the inert zone is not in series with the signal but merely operates as a switching device. When the error is sufficient to overcome the inert zone in either direction the bistable magnetic amplifier MA1 switches the gating signals sent to the gates H1, H2 and H3 to reverse their conductivity. Thus, when the error signal is greater than the minimum set value, the sample hold circuit A is locked in the hold position, with the output of the integrating amplifier A3 being held at its last measured error, while the gate H2, being now conductive, applies this error signal to the screwdown controller F. The gating signal applied to gate H3 operates to place the position feedback loop in operation. The full error signal is applied to the summing amplifier A4, thence to the conducting gate H2, power amplifiers A5 and A6, and then to the screwdown controller F. These control the generator G and motor M so as to move the screw in accordance with the error signal. The synchro-transmitter ST coupled to the screwdown motor M provides an electrical signal which is determined by its position of rotation. As discussed previously, the electrical signal is applied to a synchro-control transformer CT which transfers the signal to a demodulator or phase sensitive rectifier DM. The demodulator determines the direction and the magnitude of change in position of the screwdown motor M by the change in phasing and the magnitude of the signal. A D.C. signal is thus obtained from the demodulator that is proportional to the screw position change from a given reference and is positive if the screws move up and negative if they move down. This position signal is now fed to the summing amplifier A4 to be compared to the error input providing the position feedback signal. When the position feedback signal matches the error input to the summing amplifier A4, the screw motors stop to prepare for another cycle of correction. It is then necessary to reset the entire circuit to prepare for a new error signal. This requires that the position feedback voltage be reset to zero without returning the screws to the reference position. This is done by the use of an analog memory obtained from integrating amplifier A9 which automatically zeros the position feedback voltage by cancelling the effects of the demodulator output in a summing amplifier A7. Thus when gate H3 is conducting it acts to allow integrating amplifier A9 to follow the movement of the screws so as to set a new reference for the position feedback loop and when gate H3 is made non-conducting it holds this last measured position of the screws as a reference for the summing amplifier A7 of the position feedback loop. It will be noted that the demodulator output still exists as we have not moved the screws again. When the next error correction cycle begins, the position effectively starts from a new reference which is the necessary condition for further corrections. At the end of a coil or strip, it is necessary to reset the demodulator DM as well or it may go out of range on new errors. Also this reset can be used as a method by which the screws 3 can be returned to the initial reference position for the start of a new coil if desired. If the screws 3 are not reset, however, the control transformer CT is reset by a small screw motor MT and its associated reset relay RR such that the demodulator DM output is returned to zero at that particular screw 3 setting.

Signals from the pilot generator PG and the exciter EX are utilized to stabilize the position feed-back loop.

When the crew motor M has stopped, the signal from the counter EMF detector 5 switches the voltage detector magnetic amplifier MA3 to start the resetting operation. When this occurs, a "one" signal output appears at NOR element N11. This resets the memory flip-flop FF1 of the error magnitude sensing circuit B and sends a gating signal to the gates H1, H2 and H3 so as to make gates H1 and H3 conductive and gate H2 non-conductive. In doing this it starts the operation in the sample hold circuit of making the integrating amplifier A3 follow the error signal input. It opens the circuit between the variable voltage screwdown controller E and the summing amplifier A4, and by making gate H3 conductive gives a new reference signal to the summing amplifier A7 in accordance with the new position of the screwdown rolls. As long as the output of the NOR N11 remains at a "one," error signal greater than the set minimum error signal will not change the output of the error magnitude sensing circuit, as there is, during that time, a "one" input to NOR element N2 and to NOR element N4. However, when timer TA1 changes state after a time lag corresponding to the transport time delay, the output of NOR element N11 goes to "zero" and the system can begin to operate again.

It will be noted that other types of transport time delay circuits might be used in this system. An alternative might be a counter device which receives pulses from a pulse wheel transmitting pulses at a rate proportional to the speed of the rolls. In this type of circuit, the counter would receive pulses representing a fixed length of strip being rolled and count them until the desired number have been registered. When this occurred, the counter could supply a reset signal to reset the error magnitude sensing circuit which would in turn reset all the gates to the original condition for sampling the error.

The screwdown controller F shown is a standard adjustable voltage controller consisting of a motor, a generator, an exciter, and an amplifier. However, it can readily be seen by one skilled in the art that other types of variable motor control systems might be utilized.

While the principles of the invention have been described above in connection with specific embodiments and particular modifications thereof, it is to be clearly understood that this description is made only by way of example and not as a limitation of the scope of the invention.

We claim as our invention:

1. In a position control system operative with a machine member, the combination of position error sensing means for transmitting an error signal proportional to the deviation of the actual position of said member from a given position, error signal holding means for holding an error signal greater than a minimum error signal for a period time necessary for position correction, position control means operative with said machine member, position sensing means for producing a feedback signal proportional to a change in position, and signal combining means for subtracting said feedback signal from said error signal to produce an output signal for controlling said position control means.

2. In a position control system operative with a machine member, the combination of deviation sensing means for transmitting a deviation signal proportional to the deviation of the actual position of said member from a given position, signal holding means for holding any deviation signal greater than a minimum deviation signal for a period of time necessary for position correction, position control means, position sensing means for producing a feedback signal proportional to a change in position, signal combining means for subtracting said feedback signal from said deviation signal to produce an output signal for controlling said position control means, and gating means responsive to the magnitude of said deviation signal operative to disconnect said deviation sensing means from said signal holding means and to connect said signal combining means to said position control means for deviation signals greater than said minimum deviation signal, with said gating means being operative to connect said deviation sensing means to said signal holding means and disconnect said signal combining means from said position control means for deviation signals less than said minimum deviation signal.

3. In a position control system for a machine member, the combination of error sensing means for transmitting an error signal proportional to the deviation of the actual position of said member from a given position, error signal holding means for holding an error signal greater than a minimum error signal for a period of time necessary for position correction, position control means, position sensing means for producing a feedback signal proportional to a change in position, signal combining means for subtracting said feedback signal from said error signal to produce an output signal for controlling said position control means, gating means responsive to the magnitude of said error signal operative in a first condition to disconnect said error sensing means from said error signal holding means and connect said signal combining means to said position control means for error signals greater than said minimum error signal and operative in a second condition to connect said error sensing means to said error signal holding means and disconnect said signal combining means from said position control means for an error signal less than said minimum error signal, and resetting means responsive to the stoppage of said position control means to place said gating means in said second condition of operation.

4. In a position control system for a machine member, the combination of error sensing means for transmitting an error signal proportional to the deviation of the actual position of said machine member from a given position, error signal holding means for holding an error signal greater than a minimum error signal for a predetermined period of time necessary for position correction, position control means spaced from said error sensing means, position sensing means for producing a feedback signal proportional to a change in position, signal combining means for subtracting said feedback signal from said error signal to produce an output signal for controlling said position control means, gating means responsive to the magnitude of said error signal operative in a first condition to disconnect said error sensing means from said error signal holding means and connect said signal combining means to said position control means for an error signal greater than a given minimum error signal and operative in a second condition to connect said error sensing means to said error signal holding means and disconnect said signal combining means from said position control means for an error signal less than the given minimum error signal, time delay means, and resetting means responsive to the stoppage of said position control means to supply a signal to said time delay means for placing said gating means in said second condition of operation after said predetermined period of time based on the distance between said error sensing means and said position control means.

5. In a position control system for a machine member, the combination of error sensing means for transmitting an error signal proportional to the deviation of the actual position of said member from a given position, error signal holding means for holding an error signal greater than a minimum error signal for period of time necessary for position correction, position control means, position sensing means for producing an output feedback signal proportional to a change in position from a reference position, signal combining means for subtracting said feedback signal from said error signal to produce an output signal for controlling said position control means, setting means for setting said position control means output signal as a new position reference signal, and gating means responsive to the magnitude of said error signal operative in a first condition to disconnect said error sensing means from said error signal holding means, connect said signal combining means to said position control means and connect said setting means to said position sensing means for an error signal greater than said minimum error signal and operative in a second condition to connect said error sensing means to said error signal holding means, disconnect said signal combining means from said position control means and disconnect said setting means from said position sensing means for an error signal less than said minimum error signal.

6. In a position control system for a machine member, the combination of error sensing means for transmitting an error signal proportional to the deviation of the actual position of said member from a given position, error signal holding means for holding an error signal greater than a minimum error signal for the period of time necessary for position correction, position control means, position sensing means for producing an output feedback signal proportional to a change in position from a reference position, signal combining means for subtracting said feedback signal from said error signal to produce an output signal for controlling said position control means, first resetting means for setting said position control means output signal as a new position reference signal, gating means responsive to the magnitude of said error signal operative in a first condition to disconnect said error sensing means from said error signal holding means, connect said signal combining means to said position control means and connect said first resetting means to said position sensing means for an error signal greater than said minimum error signal and operative in a second condition to connect said error sensing means to said error signal holding means and disconnect said signal combining means from said position control means and disconnect said first resetting means from said position sensing means for an error signal less than said minimum error signal, and second resetting means responsive to the stoppage of said position control means to place said gating means in said second condition of operation.

References Cited in the file of this patent

UNITED STATES PATENTS

| | | |
|---|---|---|
| 2,390,793 | Jones | Dec. 11, 1945 |
| 2,509,295 | Glass | May 30, 1950 |
| 2,785,353 | Fenemore | Mar. 12, 1957 |
| 2,909,717 | Hulls et al. | Oct. 20, 1959 |
| 2,933,626 | Giboney et al. | Apr. 19, 1960 |

FOREIGN PATENTS

| | | |
|---|---|---|
| 571,793 | Canada | Mar. 3, 1959 |